United States Patent Office 3,659,000
Patented Apr. 25, 1972

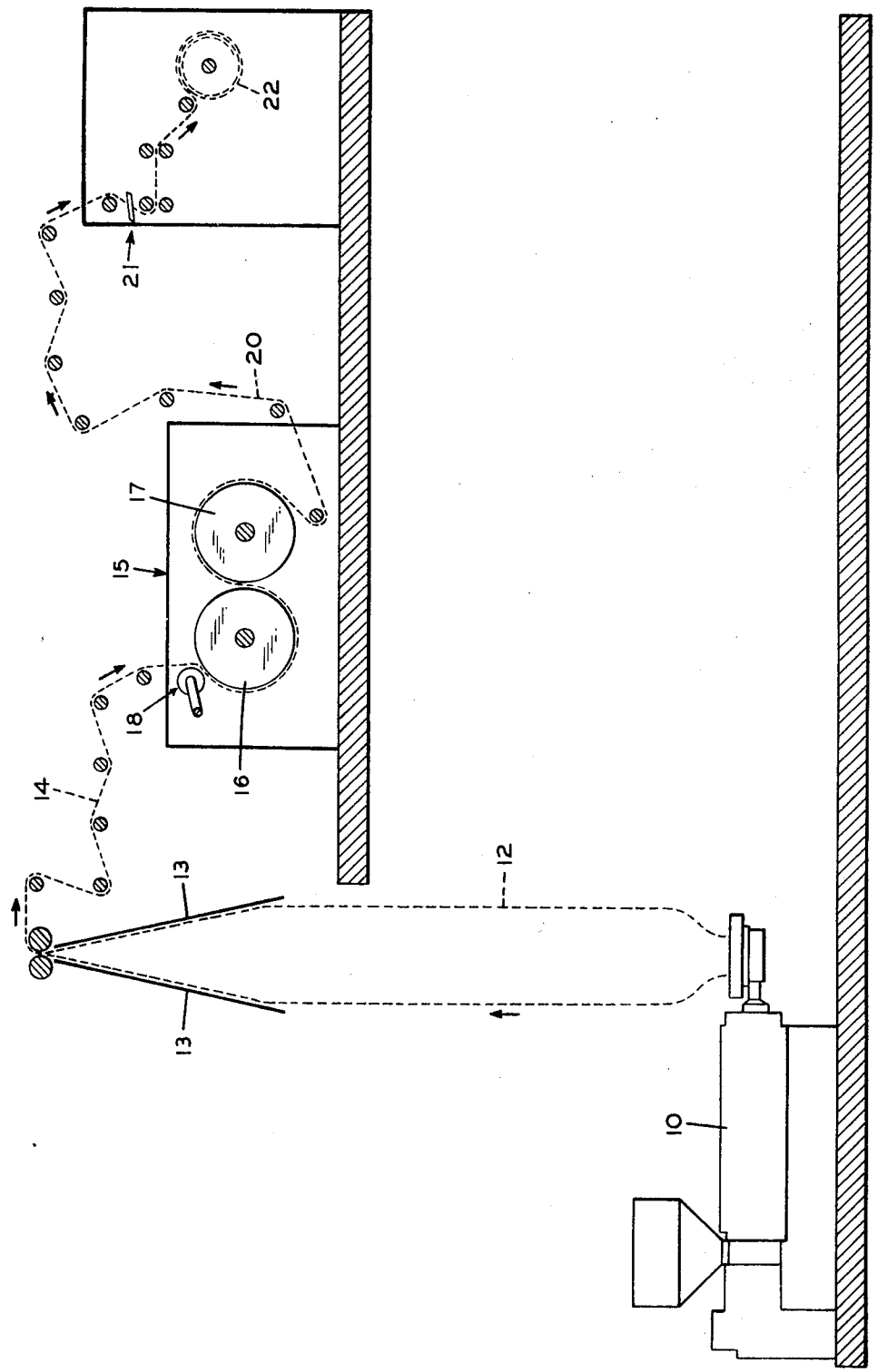

3,659,000
PROCESS FOR PRODUCTION OF LONGITUDI-
NALLY ORIENTED THERMOPLASTIC FILM
Harold C. Cronk, Pompton Plains, N.J., assignor to Allied
  Chemical Corporation, New York, N.Y.
Filed July 31, 1969, Ser. No. 846,558
Int. Cl. B29d 7/24, 7/02
U.S. Cl. 156—229                              10 Claims

ABSTRACT OF THE DISCLOSURE

Blown thermoplastic tubular film is collapsed to a two-ply layflat which is stretched in the machine direction to provide oriented shrink film. During stretching, the two-ply layflat is heated sufficiently to heat set the finished product, thereby fusing the two plies into an inseparable laminate and eliminating the need for a separate annealing step to render the product dimensionally stable at ambient temperature.

BACKGROUND OF THE INVENTION

This invention relates to a method of producing thermoplastic film, and in particular, it relates to an improved method of producing oriented shrink film.

When thermoplastic film is used in packaging applications, it is often highly desirable that the film be wrapped tightly about the contents of the package for the sake of handling ease and appearance as well as for improved protection. For this purpose, molecularly oriented films have been developed which will shrink about the contents to give a tight fit. In producing such film which is oriented along its longitudinal axis (machine direction), the film is stretched between two rollers, the second of which is driven at a greater peripheral speed than the first. Normally the film is heated during the stretching operation to a temperature between the glass transition temperature and melting point of the polymer in order to render it readily deformable to facilitate the orientation.

Heretofore, when film has been produced by the blown film extrusion method, whereby a vertical tube of film is extruded and then collapsed to a two-ply layflat, the layflat has been trimmed at the edges thereof and the two plies separated for individual winding. However, this feature has presented problems when the film was to be oriented in the manner discussed above. When a single orientation unit was utilized, by situating it before the separation of the plies, it was necessary to stretch the film below the temperature at which the plies would fuse in order to permit the subsequent separation. Inasmuch as this temperature is insufficient to heat set the oriented film, these films would then require an annealing step to prevent shrinkage of the film and roll crush at high ambient temperatures. In order to avoid the annealing step, it has been necessary heretofore to stretch the plies individually after separation, thereby requiring two orientation units; with this arrangement, stretching could be done at a temperature sufficiently high to heat set the product for ambient temperatures without a separate annealing step. Thus, neither method has provided an efficient and economical means for producing the oriented film since they require either extra processing steps or duplicate equipment on a single extrusion line.

SUMMARY OF THE INVENTION

It has now been found that longitudinally oriented thermoplastic film can be efficiently and economically produced from a tubular film which has been collapsed to a two-ply layflat without encountering the above-noted difficulties. According to the instant invention, the two-ply layflat is subjected to the stretching operation between the heated and cooled rollers with the surface of the heated roller being maintained at a temperature between the glass transition temperature and melting point of the polymer sufficient to heat set the oriented film product. The film exiting the cooled roller is thereby rendered a fused laminate which is longitudinally stretched and dimensionally stable at ambient temperature, and which can be collected upon a single windup roll without separation into individual plies and without a separate annealing step. Thus, with the instant invention it is no longer necessary to trim the edges of the layflat and separate it into individual plies prior to stretching, to stretch the film at a temperature insufficient to cause heat set or to stretch each ply individually, nor to anneal the oriented film prior to collection to render it dimensionally stable at ambient temperature.

BRIEF DESCRIPTION OF THE DRAWING

For a better understanding of the instant invention, reference is made to the accompanying drawing wherein is schematically illustrated the instant improved method.

DETAILED DESCRIPTION OF THE INVENTION

According to the instant invention, a collapsed two-ply layflat of thermoplastic film is subjected to a stretching operation to afford longitudinally oriented shrink film. With reference to the drawing, the polymer is extruded from extruder 10 in the form of an inflated tube 12, which is then passed through collapsing frame 13 to afford two-ply layflat 14. Layflat 14 is introduced into orientation unit 15, where it passes about the surface of heated roller 16, thence about the surface of cooled roller 17 which is driven at a greater peripheral speed than is roller 16. The film is nipped against roller 16 by roller 18, and roller 16 is maintained at a temperature sufficient to heat set the finished product for ambient temperature, thereby fusing the two-ply layflat into an inseparable laminate and rendering it readily deformable to facilitate stretching. The material exiting orientation unit 15 is a fused, longitudinally oriented film laminate 20, which is dimensionally stable at ambient temperature. The edge of laminate 20 is trimmed at 21 and the product is collected on windup roll 22.

Although the invention is not so limited, the tubular film is often that obtained from extrusion by the blown tubing method. The extruded tubing is collapsed to the two-ply layflat by any of a variety of means familiar to those with skill in the art, such as collapsing frames disclosed in U.S. Pats. 2,955,318; 3,061,876; 3,170,012 and 3,335,208. The layflat thus obtained may be either substantially unoriented, which will result in a monoaxially (longitudinally) oriented finished product, or circumferentially oriented, which will result in a biaxially (longitudinally and transversely) oriented finished product. The degree of transverse orientation is conveniently controlled by varying the diameter to which the extruded tube is inflated.

Upon exiting the collapsing frame, the layflat is passed through an orientation unit of conventional design, which includes two non-contacting but parallel rolls about which the film successively passes, the first roll being heated and the second one cooled. In prior operations were the two-ply layflat was stretched in this type apparatus, it was necessary to maintain the heated roll at a temperature between the glass transition temperature and melting point of the film but insufficient to cause fusion between the plies. However, the instant process requires that the heated roll be maintained at a temperature within the same broad range but sufficient to cause fusion and, in fact, requires that it be maintained at an even higher temperature, viz, one sufficient to heat set the oriented film product. By "heat set" is meant throughout the rendering of the film dimensionally stable so that it will not shrink during storage even at high ambient temperatures. The specific temperature required at the surface of the heated roll for this purpose will vary with details of the operation, and will be influenced by factors such as diameter of the heated roll, length of time the advancing film is in contact with the roll, amount of force by which the film is held against the roll, extent to which the film is stretched, composition of the extruded polymer and desired level of heat set. Typically, in the case of plasticized (flexible) polyvinyl chloride film a temperature of about 220–230° F. is adequate to cause fusion of the two plies into an inseparable laminate, but temperatures of at least about 260° F., preferably between about 270° F. and 290° F., are required to obtain the desired heat set. In actual practice of the instant invention, the proper temperature at the surface of the hot roll for any particular film can be readily determined by examining different rolls of finished product, each of which was made using a different hot roll temperature, and observing at what point the product rolls have the desired dimensional stability.

Although not required for successful operation, it is preferable to nip the advancing film against the heated roller using a conventional nip roller, thereby providing uniform and intimate contact between the two plies and the roller to facilitate formation of the fused laminate and to improve the uniformity of the product.

The cooled roller, which provides a quick quench, is spaced from the heated roller with a minimum gap consistent with the material and stretch ratio, for example, with a separation of about 0.03–0.05 inch. By minimizing the gap in this way, neckdown or transverse shrinkage is minimized during orientation. The cooled roller is driven at a peripheral speed greater than that of the heated roller to provide the desired stretching, with the stretch ratio being determined by the difference in peripheral speeds. Stretch ratio of about 2:1 is often preferred to provide 50% shrinkage of the finished product in the longitudinal (machine) direction, but of course different ratios may be used as needed and are consistent with the instant invention. In this regard, higher stretch ratios increase the possibility of core crushing, so that ratios substantially in excess of about 2.5:1 are not often used where core crushing is a problem. Nevertheless, when core crush is not a problem, greater ratios may be employed to provide a product with greater shrinkage.

As the stretched, fused laminate exits the orientation unit it is collected upon a windup roll in the conventional manner, with an advantage of the instant invention being the need for only a single roll rather than one for each ply of the original layflat. Since separation of the plies is avoided in the instant process, the process provides for shorter startup time and more economical operation. Economy is further increased since it is no longer necessary to trim the edges of layflat prior to stretching and reprocess the trimmed material. Another advantage of the instant invention is greater uniformiity in product rolls, since variations in the film gauge are averaged between the two laminated plies.

The process of the instant invention as described herein can be conveniently utilized to advantage with any of the thermoplastic polymers used in the production of films which can be longitudinally oriented, e.g. polyvinyl chloride, polyethylene, polypropylene, polyesters, nylon and polyvinylidene chloride. In a preferred embodiment of the invention, the polymer is plasticized polyvinyl chloride from which a flexible shrink film is obtained.

The following example is provided to illustrate the instant invention more fully. It is provided for illustrative purposes only and is not to be construed as limiting the invention, which is defined by the appended claims. It will be clear to those skilled in the art that certain departures from and modification of the following procedures can be made without departing from the scope of the claimed invention. In the example, unless indicated to the contrary, all quantities are expressed as parts by weight per hundred parts of resin and all temperatures are expressed in degrees Fahrenheit.

EXAMPLE

A resin is formulated for flexible, oriented polyvinyl chloride film having the following composition:

|  | Percent |
|---|---|
| Polyvinyl chloride homopolymer | 100 |
| Dioctyl adipate | 25 |
| Epoxidized soybean oil | 8 |
| Calcium-zinc stabilizer | 2 |
| Glyceryl monooleate | 5 |
| Stearic acid | 0.25 |
| Violet No. 1 Lake | 0.015 |
| Silica gel | 0.6 |

The resin is extruded from a 10" diameter die, passed through an air-ring and the resulting tubular film, having a film thickness of 0.75 mil, is inflated to a diameter of approximately 34". The inflated tubing is collapsed to a two-ply layflat of 52" width and is passed into an orientation unit, which includes two 18" diameter rolls installed on the same plane and parallel to each other, but separated by a gap of 0.050". The advancing layflat is nipped against the first roll, which is maintained at 280° F., and is wrapped on the roll for 270° before it is drawn to the cooled roll, which is driven at 2.25 times the speed of the first roll. After wrapping the cooled roll (which is maintained at 80° F.) for 270°, it is collected upon a single roll as a 0.75 mil flexible film, which is heat set but which undergoes 54.2% shrinkage (ASTM D–120–54) in the longitudinal direction.

What is claimed is:

1. A process for manufacturing longitudinally oriented thermoplastic film comprising:
   extruding an inflated tube of said thermoplastic film and collapsing said extruded tube to provide a non-bonded two-ply layflat,
   providing a pair of adjacent and substantially parallel driven rollers, one of which is a heated roller and the other a cooled roller,
   maintaining the surface of the heated roller at a temperature between the glass transition temperature and melting point of said thermoplastic film,
   contacting said two-ply layflat under pressure against said heated roller, thereby simultaneously fusing the plies of said two-ply layflat into a fused laminate, heat setting said fused laminate, and rendering said fused laminate susceptible to stretching in a heated condition, and
   contacting said fused laminate against and at least partially around said cooled roller immediately after emanating from said heated roller and simultaneously longitudinally stretching said fused laminate, while in said heated condition, by driving said cooled roller at a peripheral speed greater than the peripheral speed of the heated roller.

2. The process of claim 1 wherein said two-ply layflat is substantially unoriented prior to contacting said heated roller.

3. The process of claim 2 wherein said thermoplastic film is plasticized polyvinyl chloride film, wherein the surface of said heated roller is maintained at a temperature between about 270° F. and about 290° F., wherein said cooled roller is driven at approximately twice the peripheral speed of said heated roller and wherein said stretched, fused laminate exiting said cooled roller is taken up upon a single collection means.

4. The improved process of claim 1 which additionally comprises nipping said two-ply layflat against said heated roller.

5. The improved process of claim 1 wherein the peripheral speed of said cooled roller is approximately twice the peripheral speed of said heated roller.

6. The improved process of claim 1 wherein the edge of said two-ply layflat is untrimmed prior to said stretching.

7. The improved process of claim 1 wherein said thermoplastic film is flexible polyvinyl chloride film.

8. The improved process of claim 7 wherein the surface of said heated roller is maintained between about 260° F. and the melting point of said flexible polyvinyl chloride film.

9. The improved process of claim 8 wherein the temperature of the surface of said heated roller is between about 270° F. and 290° F.

10. The improved process of claim 1 which additionally comprises taking up the stretched, fused laminate exiting said cooled roller upon a single collection means.

References Cited

UNITED STATES PATENTS

| | | | |
|---|---|---|---|
| 3,277,221 | 10/1966 | Parrish | 156—244 X |
| 3,339,234 | 9/1967 | Utz | 156—244 X |
| 3,340,122 | 9/1967 | Hofer | 156—244 |
| 3,383,445 | 5/1968 | Gebler et al. | 264—95 |
| 3,510,549 | 5/1970 | Tsuboshima et al. | 264—95 |
| 3,519,513 | 7/1970 | Wilharm | 156—244 |

FOREIGN PATENTS

| | | | |
|---|---|---|---|
| 840,191 | 7/1960 | Great Britain | 264—95 |

CARL D. QUARFORTH, Primary Examiner

R. GAITHER, Assistant Examiner

U.S. Cl. X.R.

156—244, 165; 264—95, 210 R, 291